United States Patent [19]

Belansky

[11] 3,738,192
[45] June 12, 1973

[54] LIMITED SLIP DIFFERENTIAL MECHANISMS

[75] Inventor: Rudolph J. Belansky, Chicago, Ill.

[73] Assignee: Illinois Tool Works Inc., Chicago, Ill.

[22] Filed: June 29, 1971

[21] Appl. No.: 157,820

[52] U.S. Cl. ................................. 74/711, 74/714
[51] Int. Cl. .......................... F16h 1/44, F16h 1/42
[58] Field of Search.................... 74/711, 710.5, 714

[56] References Cited
UNITED STATES PATENTS

| | | | |
|---|---|---|---|
| 3,406,593 | 10/1968 | Vesey | 74/711 |
| 2,786,366 | 3/1957 | Tallakson | 74/711 |
| 1,203,085 | 10/1916 | Wallace | 74/710.5 |
| 1,229,548 | 6/1917 | Van Sant et al. | 74/711 |
| 1,454,578 | 5/1923 | Towler | 74/711 |
| 3,060,765 | 10/1962 | Rinsoz | 74/710.5 |

*Primary Examiner*—Arthur T. McKeon
*Attorney*—Robert W. Beart, Jack R. Halvorsen, Thomas W. Buckman et al.

[57] ABSTRACT

A limited slip differential having sun and pinion gears of the spur gear type with the pinion gears having various forms of hub means wherein the hub means cooperate with the pinion gears, the sun gears and the housing to properly position all of the elements to provide effective differential action and to produce sufficient friction or reactive forces between the elements to provide limited slip action.

9 Claims, 10 Drawing Figures

Inventor
Rudolph J. Belansky
By: Olson, Trexler, Wolters & Bushnell

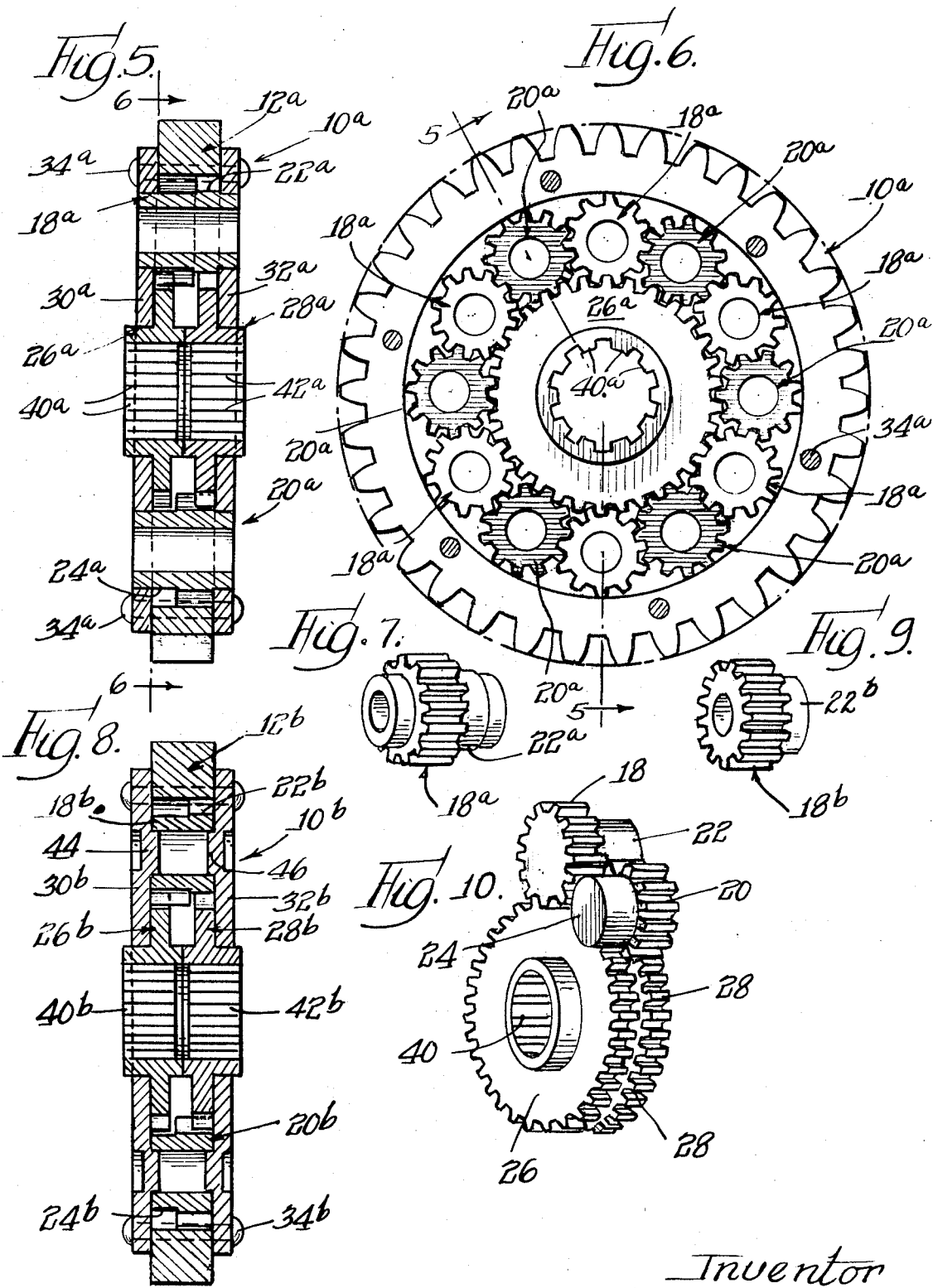

LIMITED SLIP DIFFERENTIAL MECHANISMS

SUMMARY OF THE INVENTION

Limited slip differential mechanisms have heretofore been employed which incorporate two sets of circumferentially spaced pinions, as will be evident from the disclosure in the prior U.S. Pat. to Saari, No. 3,292,456. While differential mechanisms of such design have met with commerical success, the manufacturing cost has been comparatively high. It is, therefore, one of the important objects of the present invention to produce a novel and practical limited slip differential mechanism which is relatively simple in design, and hence, may be produced at comparatively low cost.

The important objects of the invention are attained by providing the pinion gears with hub means which cooperate with the pinion gears and sun gears and the housing to produce a simple, economical and effective limited slip differential.

It is contemplated that the hub means can take various forms, each of which in the combination of elements results in a limited slip differential attaining the stated objects. In every embodiment of the invention, the hub means is formed either as an integral part of its associated pinion gear or at least mounted thereon against radial movement relative to its associated pinion gear.

Important features of the various embodiments are that the housing end plates are simple plate constructions, and that the center annular housing may be a simple ring member.

BRIEF DESCRIPTION OF THE DRAWINGS

The foregoing and other objects and advantages will be more apparent from the following detailed description when considered in connection with the accompanying drawings wherein:

FIG. 5 is a transverse sectional view similar to FIG. 2 disclosing a differential mechanism of modified form;

FIG. 6 is a fragmentary vertical sectional view taken substantially along the line 6—6 of FIG. 5;

FIG. 7 is a perspective view of one of the pinions illustrated in FIGS. 5 and 6;

FIG. 8 is a transverse sectional view similar to FIGS. 2 and 5, disclosing a further modified form of limited slip differential mechanism of the type contemplated by the present invention;

FIG. 9 is a perspective view of one of the pinions illustrated in FIG. 8; and

FIG. 10 is a fragmentary perspective view of two detached pinions and complementary sun gears of the type illustrated in FIGS. 1 to 4, inclusive.

DESCRIPTION OF THE PREFERRED EMBODIMENTS

Figure 1:
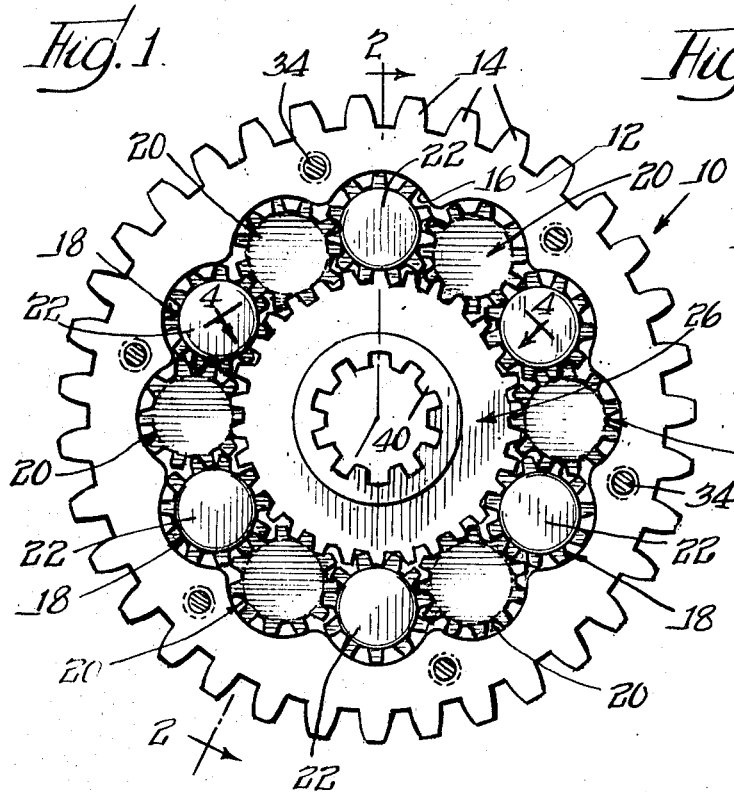
FIG. 1 is a vertical section, taken substantially along the line 1—1 of FIG. 2, disclosing the side view of a limited slip differential mechanism which is representative of one embodiment of the present invention.

In each embodiment of the invention, the differential construction includes a ring-like or annular center housing member, a pair of circular end plates, two sun gears and a plurality of pinion gears having hub means. Fasteners through the end plates and the annular housing member secure the noted elements together as a complete differential. As is known in differentials, means must be provided to drive or rotate the housing, and independent axles, each keyed to one of the sun gears, are the output members. The means for rotating the housing can take many different forms. As seen in FIG. 1, gear teeth may be provided on the periphery of the center annular housing member. Instead of gear teeth, sprocket teeth or a V-belt pulley may be provided. Further, the driving elements may be provided as separate annular elements and secured to the housing. Also, the end plates rather than the center annular housing may be formed to have integral driving means such as gear or sprocket teeth.

Referring to the drawings more in detail, wherein like numerals have been employed to designate similar parts through the various figures, it will be seen that one embodiment of a differential mechanism contemplated by the present invention is shown by the numeral 10. The mechanism 10 includes a center housing member 12 having external peripheral teeth 14. Alternatively, the teeth 14 may be formed on a separate member secured to member 12. The internal periphery of the member 12 is formed with scallops or arcuate recesses 16 to accommodate peripheral sections of pinions 18 of one group and pinions 20 of another group, as clearly shown in FIG. 1. The pinions 18 are each formed with an integral, cylindrical axial extension or hub 22 and the pinions 20 are each formed with a similar axial extension or hub 24. Alternatively, the hubs 22 and 24 may be formed as separate members journaled on the respective pinions 18 and 20.

Figure 2:
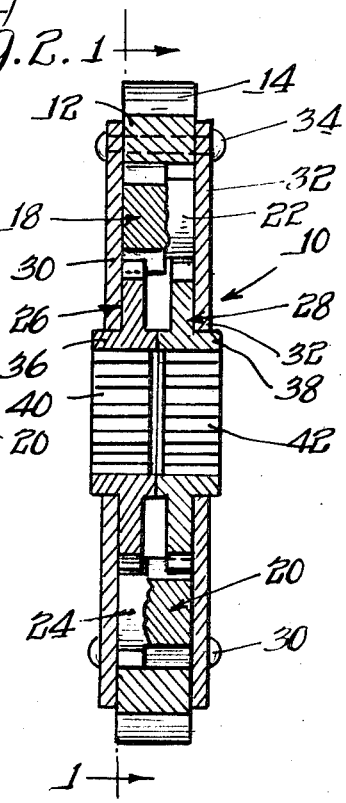
FIG. 2 is a transverse sectional view of the device illustrated in FIG. 1, said view being taken substantially along the line 2—2 of FIG. 1.
Figure 3:
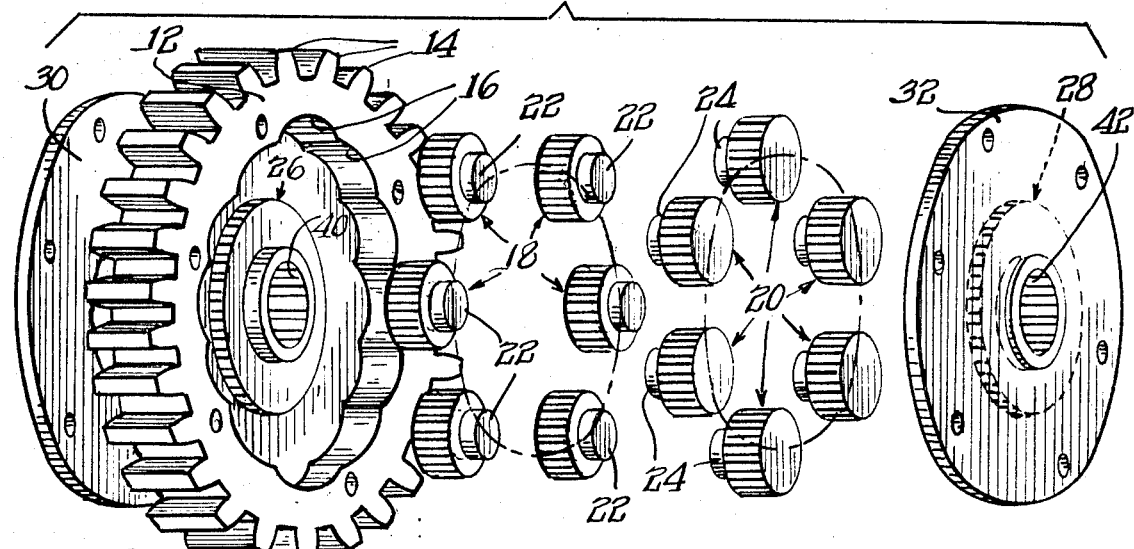
FIG. 3 is a perspective exploded view disclosing the constituent elements of the differential mechanism of FIGS. 1 and 2.
Figure 4:
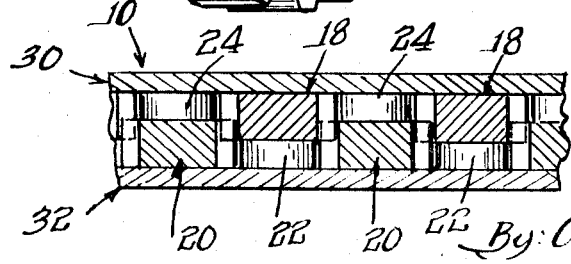
FIG. 4 is a fragmentary sectional view taken substantially along the line 4—4 of FIG. 1.

The pinions 18 mesh with a side or sun gear 26 and the pinions 20 mesh with the corresponding sun gear 28. End plates 30 and 32 are secured as a unit with the member 12 by means of suitable fasteners or rivets 34, and cooperate with the member 12 in providing a housing or retainer for the pinions 18 and 20 and the sun gears 26 and 28. The plate 30 provides a bearing for a hub section 36 of the sun gear 26, and the disk or plate member 32 provides a bearing for a hub section 38 of the gear 28, as clearly shown in FIG. 2.

The sun gear 26 is formed with internal axially extending splines 40 to accommodate a complementary splined shaft (not shown) and the sun gear 28 is provided with similar internal longitudinal splines 42 to accommodate a correspondingly splined shaft (not shown). It will also be noted that pinions 18 mesh with the pinions 20 over a limited axial extent, the remainder of the axial extent of the pinions 18 and 20 meshing respectively with the gun gears 26 and 28. It will be apparent from the foregoing that as power is applied to rotate the member 12, the pinions 18 and 20 are rotatable within the member 12 and in meshing relationship with their respective sun gears 26 and 28.

Particular attention is directed to the fact that the diameters of the pinion hubs or extensions 22 and 24 are such that the extremities of the teeth of the pinions 18 will contact complementary hubs 24 of the pinions 20, and the outer extremities of the teeth of the pinions 20 will similarly contact the peripheral surfaces of complementary cylindrical extensions or hubs 22 of the pinions 18. Thus, the diameters of the hubs or extensions 22 and 24 approximate the root diameter of the pinions. This described arrangement provides a proper positioning between the pinions 18 and 20, the member 12, and sun gears 26 and 28, so that when a rotating force is applied to the member 12, the internal reacting forces will result in an excellent bias effect. The outer extremities of the pinion teeth are adapted to frictionally engage the arcuate surfaces defining the scallops or apertures 16 along the inner periphery of the member 12. Approximately two-thirds of the overall length of the pinion teeth of one group engage with the hub sections of the other group. Thus, the remaining one-third of the overall length of the pinions 18 mesh with approximately one-third of the overall length of the teeth of the pinions 20.

Attention is also directed to the fact that the outer extremities of the teeth of the sun gear 26 are adapted to contact the hub sections 24 of the pinions 20, and likewise the outer extremities of the teeth of the sun gear 28 are adapted to engage the peripheries of the hub sections 22 of the pinions 18. Again it should be understood that the relatively loose mounting and arrangement of pinions, as previously referred to, assures the development of the required degree of contact between the hub sections and the pinion teeth to provide desirable spin-limiting properties of the vehicle axles, and the like, with which the differential may be coupled. The reaction forces in the described combination of tooth-to-hub contact of hub sections and pinion teeth, and pinion teeth to the cusps of the scallops, during differential action may be described as producing a climbing action or somewhat intermittent grabbing motion. This unique operation produces an excellent limited slip action.

It will be apparent from the foregoing description that torque is transmitted from the member 12 through the planet pinions 18 and 20. The pinions 18 and 20 transmit torque through their respective sun gears 26 and 28 which in turn apply torque to the axles (not shown), with which the sun gears may be coupled. It should be noted that the planet pinions are not mounted on bearings or journals, but are constrained to remain in their respective housed positions by the tips of the pinion teeth contacting the scallop surfaces and the peripheral surfaces of the pinion hubs, as well as the teeth of the sun gears. Also, the end faces of the pinions, the hubs, and the sun gears contact the inner surfaces of the end plates 30 and 32 to provide additional restraint on the rotation of those elements.

In FIGS. 5, 6 and 7, the limited slip differential mechanism of modifed form is disclosed and is designated generally by the numeral 10a. One significant difference in the structure of differential 10a over the previously described differential 10 is in the design of the pinions 18a and 20a. The pinions 18a and 20a are centrally apertured, are provided with axially extended hub portions, and are rotatably mounted at the opposite extremities thereof within end plates 30a and 32a. These end plates 30a and 32a are secured to the opposite sides of the central annular housing member 12a by suitable fasteners or rivets 34a. Although no specific means are shown for driving the subject embodiment, it is contemplated as previously noted that the outer periphery of the annular member 12a may be provided with gear or sprocket teeth as in the first described embodiment, or any of the other previously noted driving arrangements may be provided. It should further be noted that since the pinions 18a and 20a are journaled within the end plates 30a and 32a, the inner periphery of the member 12a need not be provided with the scallops described in regard to the first embodiment.

Similarly to the first embodiment, a sun gear 26a meshes with the teeth of the pinions 18a and a sun gear 28a meshes with the teeth of the pinions 20a. Hub sections 22a of the pinions 18a substantially functionally correspond with the previously described hub sections 22, and sections 24a of the pinions 20a substantially, similarly function to the previously described hub sections 24. The sun gears 26a and 28a function similarly to the previously mentioned sun gears 26 and 28 and are provided respectively with splines 40a and 42a for accommodating correspondingly splined shafts or axles, not shown.

In the embodiment of FIGS. 5, 6 and 7, the internal reactive forces produced when the member 12a is rotatively driven are substantially similar to the reactive forces of the first embodiment in the intermittent grabbing or climbing action engagement between the hub portions and the tips of the pinion teeth because of the clearance between the extending hubs in the holes in the side plates. The engagement of the tips of the pinion teeth with the inner periphery of the member 12a is also a somewhat intermittent grabbing or climbing action. Further restraint or reaction is provided by the annular ends of the hubs of the pinions 18a and 24a journaled in the end plates 30a and 32a.

FIGS. 8 and 9 disclose another embodiment of the present invention in the form of a differential designated generally by the numeral 10b. The differential mechanism 10b is operationally quite similar to the previously described embodiments. The pinion construction is similar to that of the first described embodiment in that the axial length is the same, and similar to that of the second described embodiment in that the pinions 18b and 20b are centrally apertured. Pinions 18b and 20b do not extend through openings in the end plates 30b and 32b, but accommodate projections 44 and 46 respectively in end plates 30b and 32b. The projections 44 and 46 may be formed by indenting the end plates, as illustrated in FIG. 8. Parts of the mechanism 10b, which substantially correspond structurally and functionally with parts of the previously described differential mechanism, are indicated by corresponding numerals bearing the suffix b.

In the embodiment of FIGS. 8 and 9, friction or reactive forces are produced as previously described in regard to the tooth-to-hub contact of the other embodiments and additional restraining forces are produced between the central aperture of the pinions 18b and 20b and the circumferential surface of the projections 44 and 46. As in the embodiment of FIGS. 5, 6 and 7, the central housing member 12b does not include the scallops 16 of the first embodiment.

From the foregoing, it will be apparent that the present invention contemplates the provision of an improved limited slip differential mechanism which is relatively simple in structural design and yet of relatively sturdy construction. Although only three basic embodiments of the present invention are disclosed, it should be understood that other embodiments are contemplated in which reactive forces are produced in a differential of the type described by providing hub means on the pinion gears in arrangements wherein the hub means is restrained from any radial movement relative to its associated pinion gear and in which there is hub-to-tooth contact between adjacent pinions and hub-to-tooth contact with the pinion hubs and the teeth of the cooperating sun gears.

Having described the invention, it is to be understood that changes can be made in the described embodiments as noted within the spirit and scope of the invention as defined by the appended claims.

I claim:

1. A limited slip differential mechamism including rotatable housing means, a pair of sun gears rotatably mounted in said housing means, each of said gears adapted to be drivingly coupled with shaft means, a group of first pinion gears in said housing meshing with one of said sun gears, a group of second pinion gears in said housing meshing with the other of said pair of sun gears, each of the pinion gears of one group having limited meshing engagement with two pinion gears of the other group, and hub sections etending axially from one extremity of each pinion gear and providing peripheral gear teeth engaging surfaces, said peripheral surfaces being so disposed that the extremities of the gear teeth of one group of pinion gears contact the peripheral surfaces of the hub sections of the other group of pinion gears, and the extremities of the teeth of one of the sun gears contact the peripheral surfaces of the hub sections of the pinion gears meshing with the other sun gear.

2. A limited slip differential mechanism as set forth in claim 1, wherein the hub sections are formed integral with complementary pinion gears.

3. A limited slip differential mechanism as set forth in claim 1, wherein the diameter of each hub section approximates the root diameter of the pinion gear associated therewith.

4. A limited slip differential mechanism as set forth in claim 1, wherein the pinion gears and associated hub sections are formed to have clearance within restricted limits with respect to the inner surfaces of the end plates.

5. A limited slip differential mechanism as set forth in claim 1, wherein the pinion gears and associated hub sections are formed to have lateral clearance within restricted limits.

6. A limited slip differential mechanism as set forth in claim 1, wherein the end surfaces of each group of pinion gears are engageable with the inner surface of one of said end plates and the end surfaces of the hub sections in said group are engageable with the inner surface of the other end plate.

7. A limited slip differential mechanism as set forth in claim 1, wherein the inner surface of each end plate is coincident with a plane which is normal to the axes of the pinion and sun gears.

8. A limited slip differential mechanism as set forth in claim 1, wherein hub sections extend from opposite sides of each pinion gear.

9. A limited slip differential mechanism as set forth in claim 8, wherein said end plates rotatably support the extremities of said hub sections.

* * * * *